United States Patent Office 3,440,696
Patented Apr. 29, 1969

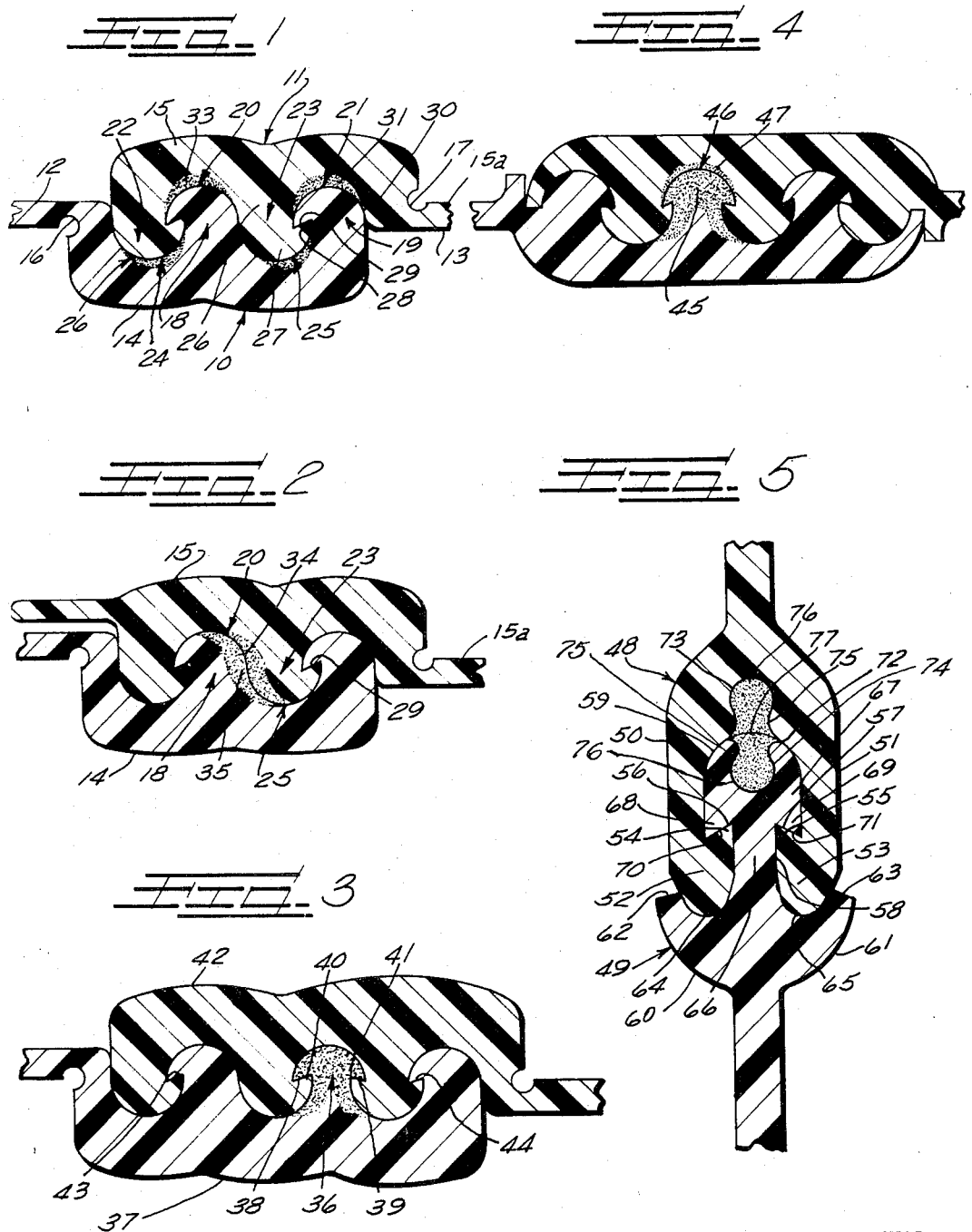

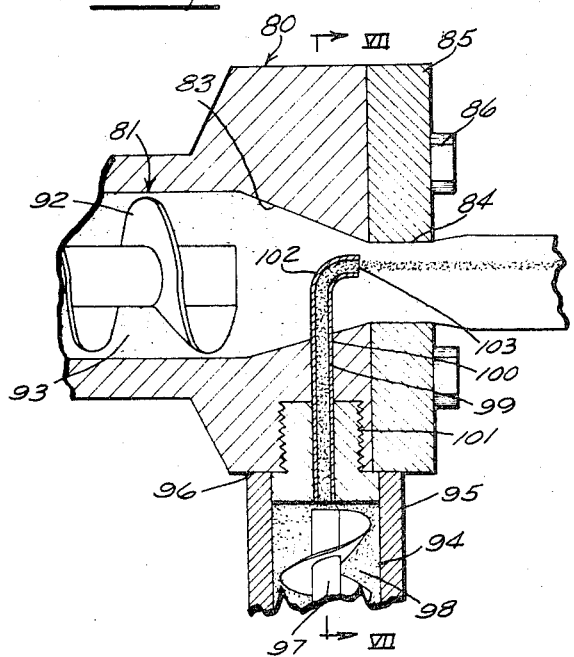
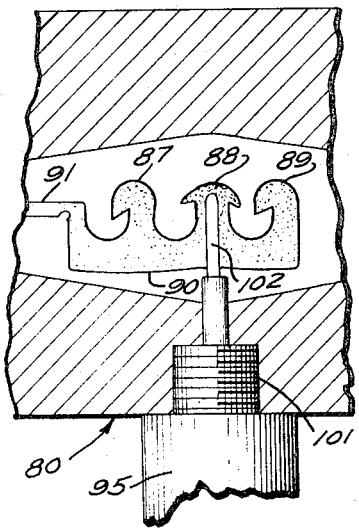
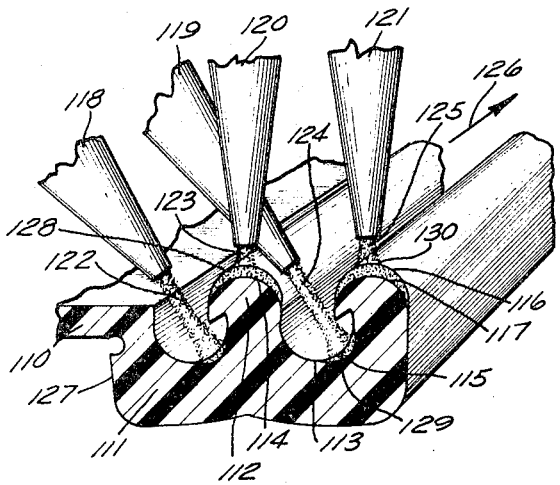
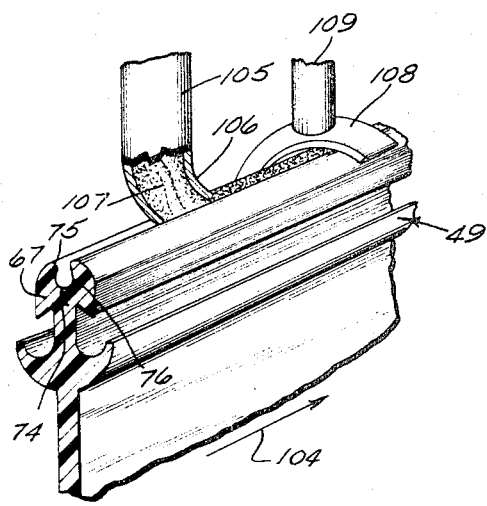

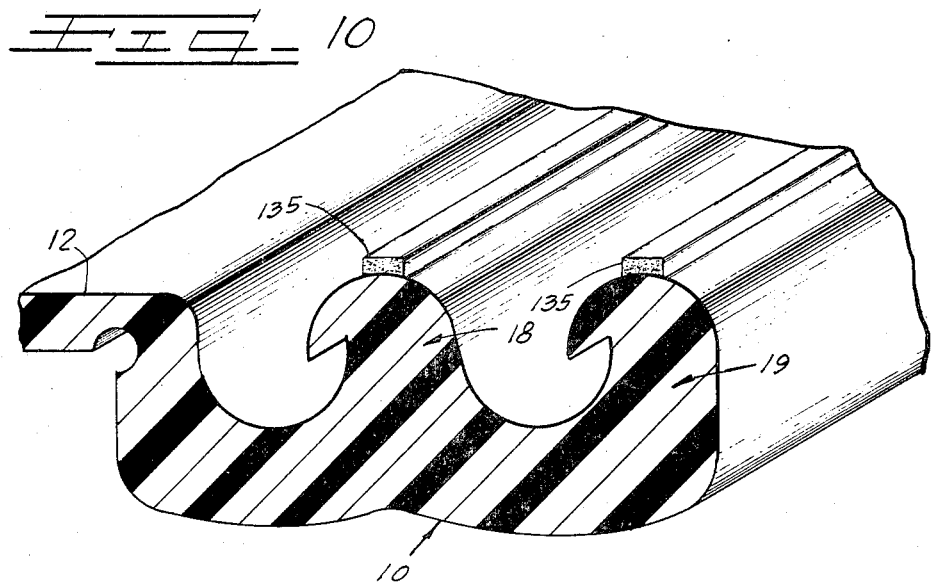
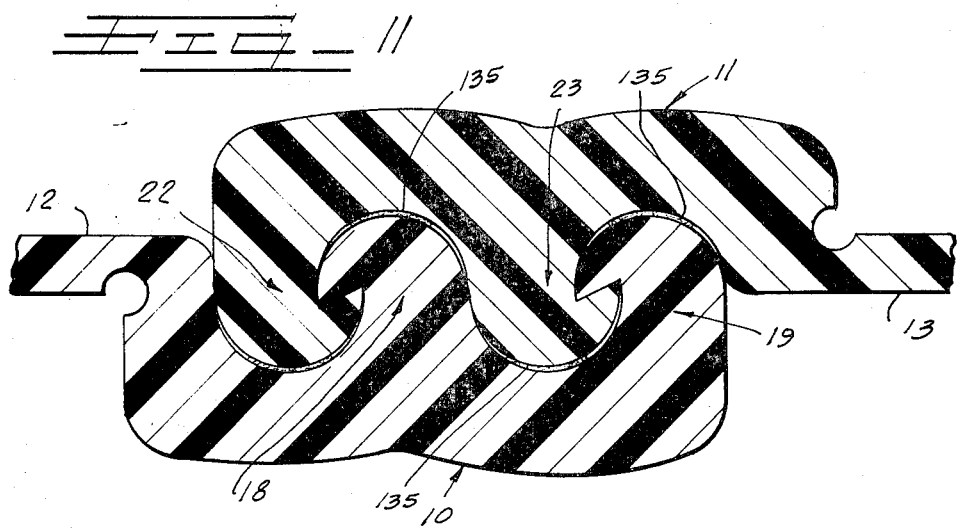

3,440,696
SEALING FASTENER
Karel J. Staller, Rutherford, N.J., assignor to Flexigrip, Inc., Orangeburg, N.Y., a corporation of New York
Filed Oct. 22, 1965, Ser. No. 501,768
Int. Cl. A44b 21/00
U.S. Cl. 24—201    11 Claims

ABSTRACT OF THE DISCLOSURE

A flexible closure which includes a pair of closure strips each having a web portion and a marginal portion formed integrally wherein the marginal portions are provided with interlocking rib and groove elements and wherein the elements are principally formed of a first more rigid thermoplastic substance and wherein the elements have a layer or layers of a softer thermoplastic substance disposed thereon so as to provide both a rigid interlocking between the closure strips and a sealed engagement between the rib and groove elements such that a pouch or container associated therewith may be vapor-sealed.

---

The present invention relates to a pouch or similar container having a novel resilient type fastener structure. In particular, this invention relates to a fastener for a pouch which provides both a lock and a hermetic seal during engagement thereof.

Recent developments in resilient type fasteners have resulted in inexpensive and dependable means for closing and locking a variety of containers such as brief cases, pocket purses, and the like. However, resilient fasteners have not been equally applicable to all types of containers where such a fastener would for many reasons be desirable.

In particular, the storage of items that are subject to corrosion or that lose quality upon exposure to the atmosphere has not been entirely successful due to the nature of resilient fasteners.

The resilient fastener operates on the principle that resilient ribs in one fastener member will deform for being fitted past restricted groove openings in a second fastener member. Once past the restricted opening, the deformed rib will resume its unrestrained configuration and expand for being trapped within an enlarged groove cavity. This need for the rib member to snap into its unrestrained configuration after passing the restricted opening has heretofore required some looseness in the resulting assembly.

It is apparent, therefore, that highly effervescent and corrosive susceptible materials have not been especially suited for use with this type of fastener.

Accordingly, it is a principal object of this invention to provide a resilient type fastener for use with a pouch container to store corrosive susceptible items, effervescent materials, and other atmosphere deteriorating substances.

It is also an object of this invention to provide a resilient type fastener which has interlocking rib and groove elements and which, in addition, has means for providing a hermetic seal between the fastening members.

It is another object of this invention to provide a resilient type fastener having interlocking rib and groove elements constructed, in part, of a first thermoplastic substance and, in part, of a second thermoplastic substance.

It is a further object of this invention to provide a resilient fastener having interlocking rib and groove elements in which one of said elements is constructed of relatively rigid flexible material and a second of said elements is constructed of a relatively resilient flexible or soft material.

It is a further object of this invention to provide a resilient type fastener having interlocking rib and groove elements constructed of a relatively rigid thermoplastic substance and which has a discretely positioned layer of a comparatively resilient thermoplastic substance disposed thereon for providing a vapor lock or air lock between the fastener junction.

It is an additional object of this invention to provide a resilient type fastener having interlocking rib and groove elements consisting of undercut engaging surfaces and rounded head portions wherein said undercut engaging surfaces are constructed of a first relatively rigid thermoplastic substance and said rounded head portions are constructed of a comparatively soft thermoplastic substance.

It is yet another object of this invention to provide interlocking rib and groove elements of a resilient type fastener having cooperable faces formed of a relatively soft thermoplastic substance for providing a hermetic seal therebetween and having principal structural surfaces constructed of a relatively rigid thermoplastic substance for performing a locking function.

It is another object of this invention to provide a method for forming a resilient type fastener having interlocking rib and groove elements having each of the above-mentioned features.

It is also an object of this invention to provide a means for applying a layer of a relatively soft thermoplastic substance to a preformed resilient type fastener having interlocking rib and groove elements formed of a relatively rigid thermoplastic substance.

It is an additional object of this invention to provide a device for accomplishing each of the above-outlined objects.

These and other objects, features and advantages of the present invention will be understood in greater detail from the following description and the associated drawings wherein reference numerals are utilized in designating a preferred embodiment and wherein:

FIGURE 1 is a sectional view of a resilient type fastener having interlocking rib and groove elements constructed of a first relatively rigid thermoplastic substance and having a layer of a second relatively resilient thermoplastic substance disposed at the cooperable grooves thereof;

FIGURE 2 is a sectional view of a resilient fastener similar to that shown in FIGURE 1 for disclosing an alternate manner of applying a second resilient material between the cooperable faces of the associated interlocking elements;

FIGURE 3 is a sectional view of a resilient type fastener showing a series of interlocking rib and groove elements wherein one of said elements is constructed of a relatively soft thermoplastic substance for providing a hermetic seal between the associated members;

FIGURE 4 is a sectional view of a resilient type fastener having another structural characteristic and showing cooperable rib and groove elements formed of a relatively soft thermoplastic substance;

FIGURE 5 is another sectional view of a resilient fastener having an alternate locking structure and having a resilient means for providing a vapor lock or air lock between the associated and cooperable members;

FIGURE 6 is a sectional view of a machine which may be utilized for developing the structures of FIGURES 1 through 5 and particularly for developing the structures of FIGURES 3 and 4;

FIGURE 7 is a sectional view taken along the lines VII—VII of FIGURE 6;

FIGURE 8 is a partially sectioned isometric view of a device for forming the novel fastener structure as shown in FIGURE 5;

FIGURE 9 is an elevational and isometric view of a device for developing the novel structures as illustrated in FIGURES 1 and 2;

FIGURE 10 is a sectional view showing an embodiment having a ridge formed at the rib elements thereof; and FIGURE 11 is a view showing the compression during assembly of the ridge structure illustrated in FIGURE 11.

Resilient type fasteners must be constructed of a high durometer thermoplastic substance if the junction of the interlocking elements is to be able to withstand sufficient load forces. The thermoplastic substance must be sufficiently flexible to permit deformation of the cooperable members while being engaged. However, once engaged, the fastener members must be sufficiently rigid to resist disengagement at undercut or catch surfaces. To solve this problem resilient type fasteners must be made to fit together with a looseness such as to accommodate the necessary rigidity of the principal structural material.

FIGURE 1 is a general example of a resilient type fastener according to this invention which utilizes the principal relatively rigid thermoplastic substance to a maximum advantage for providing a secure locking assembly. At the same time the structure of FIGURE 1 recognizes that the comparatively rigid thermoplastic material needed for locking purposes is not a necessity in certain regions of the cooperable members, and that those regions can be transformed for improving the sealing characteristic of the fastener.

Referring to FIGURE 1 in greater detail, a first flexible closure strip 10 is shown in engagement with a second closure strip 11 for providing both a lock and a hermetic seal between opposite web portions 12 and 13 of a flexible pouch, container or the like. It should be noted that reference to a flexible closure strip in this application refers to a portion or region adjacent to the opening of a pouch or container which includes the interlocking rib and groove elements and which may either consist of a separate strip heat sealed to wall portions of the container or which may be formed integrally with the container walls.

The web portions 12 and 13 are formed integrally with marginal portions 14 and 15 and are provided with longitudinal grooves 16 and 17 formed intermediate thereof to provide easier flexing of the associated web and marginal portions.

The marginal portion 14 has rib elements 18 and 19 for being cooperable with associated groove elements 20 and 21 respectively of the marginal portion 15. Likewise, the marginal portion 15 is provided with rib elements 22 and 23 for being cooperable with associated groove elements 24 and 25 of the marginal portion 14.

The rib elements in FIGURE 1 comprise a shank portion 26 and an integral head portion 27 having an overhanging ridge and an undercut engaging surface 29 for being cooperable with a like engaging surface of an adjacently fitted rib element. The groove elements have a restricted opening 30 and an enlarged inner cavity 31 for receiving the head portion 27 of the complementary rib element.

Locking of the respective fastener members is accomplished by applying a pressure at the outer surface of the marginal portions 14 and 15 for initially deforming the overhanging ridges of the rib elements in the vicinity of the groove opening 30. Once the rib element, however, gains entry into the enlarged inner cavity of the groove element, the overhanging ridges resume an unstressed condition and engage each other at the undercut engaging surfaces 29. Hence, while a relatively slight inward pressure at the marginal portions 14 and 15 result in engagement of the fastener members, the overhanging ridges together with the cooperable undercut engaging surfaces prevent the reopening or separating of the marginal portions. Separation, however, may be achieved either with a slider featuring a wedge that is inserted between the marginal portions 14 and 15, which are then peeled apart as the wedge is drawn between them, or by lifting a flange 15a integrally extruded along the length of one of the outer fastener ridges and thus pulling out the fastener head from its respective groove.

As mentioned, the need for snap fitting of the rib elements within the associated groove elements has necessitated certain looseness in the fastener union which allows the passage of air between the complementary surfaces. Also, it is to be recalled that the rigidity of the thermoplastic material must be retained if the undercut engaging surfaces are to have sufficient strength for resisting an opening force.

In FIGURE 1, and in all subsequent figures, the relative rigidity of the undercut engaging surfaces is maintained, and a sealing structure has been added in regions where thermo-plastic rigidity is of no consequence to the locking feature.

This sealing structure consists of a layer of a relatively resilient thermoplastic material disposed at the base portion of the enlarged inner cavities of the complementary grooves. The layer 33 of relatively soft material is formed integrally with the marginal portion and has a thickness provided to give total resiliency to the fastener structure at that point to allow the rib elements to be received within the complementary groove elements without resulting looseness of assembly.

In particular, the layer 33 is compressed due to the initial deformation of the head portion 27 and then allowed to spring back for providing a hermetic seal after the head portion 27 has resumed its unrestrained configuration. Also, the resilient layer 33, due to its soft character, will conform to surface irregularities of the rib portions for improving the quality of the sealed juncture. To insure an absolutely tight seal, the resilient head portions of the fastener may be made a little larger, and where resilient groove portions are used, these could be made a little smaller. In such a case the soft resilient sealing layers are kept under compression and complete contact is assured.

FIGURE 2 shows a resilient type fastener similar to that of FIGURE 1 illustrating a different sealing structure between the cooperable members. In particular, the rib element 18 and the adjacent groove element 25 of the marginal portion 14 have a continuous surface 34 formed therebetween.

To accomplish the sealing function of this invention a layer 35 of a relatively soft thermoplastic substance is formed integrally with the outer regions of the continuous surface 34. Similarly, a layer of the same thermoplastic substance is disposed between the rib element 23 and the adjacent groove 20 of the marginal portion 15. The result is that a substantially extensive junction line from the upper portions of the rib element 18 to the base of the groove 25 offers a sealing region between the cooperable rib elements 18 and 23.

It is to be noted that, as in the previous example, the undercut engaging surfaces 29 is formed of a comparatively rigid thermoplastic substance for maintaining the locking function of the associated members. Also, the region intermediate the crest of the rib element 18 and the base of the adjacent groove element 25, which contains the relatively soft structural material, is not a critical region for maintaining the locking relationship of the cooperable members.

Another embodiment of this invention is shown in FIGURE 3 wherein an entire rib element is formed of a comparatively soft thermoplastic substance for providing the sealing function. In FIGURE 3 the rib element 36 is formed of a comparatively resilient material and is provided to be integral with the marginal portion 37 of the closure strip. The rib element 36 has a structure not encountered in FIGURES 1 and 2. Principally, the element 36 has oppositely disposed overhanging ridges 38 and 39 which have undercut engaging surfaces 40 and 41 cooperable with like engaging surfaces of adjacently fitted rib elements of the oppositely disposed marginal portion 42.

It has been noted regarding FIGURES 1 and 2 that the overhanging and undercut engaging surfaces must be constructed of a comparatively rigid thermoplastic substance to assure proper locking of the complementary members. FIGURE 3 affirms the need for rigidity in the undercut engaging surfaces, in that it provides such rigid engaging surfaces at both sides of the relatively soft rib element 36. The rigid engaging surfaces are provided as at 43 and 44 to resist an opening force applied to the closure strips.

By providing an auxiliary undercut engaging surface formed of a soft resilient material for the purpose of developing a hermetic seal between the closure strips an important achievement is found. In particular, forces which are applied to the closure strip which are directed for opening the marginal portions 37 and 42 will cause all undercut engaging surfaces to be compressed. This means that the hermetic seal of this example will be engaged during both stressed and unstressed conditions. Here again, for insuring an absolute seal, the rib that is made of soft resilient material may be made slightly larger than its corresponding groove.

Still another structure for providing hermetic or airtight seal between the flexible closure strips of this invention is shown in FIGURE 4. In FIGURE 4, which has obvious characteristics similar to those of FIGURE 3, a rib element 45 is constructed of a substantially soft thermoplastic substance. In addition, the complementary groove element 46 has a layer 47 of the soft thermoplastic substance formed thereon for providing an improved sealing feature therebetween. By providing a soft thermoplastic substance on both the rib and the groove elements, any irregularities necessarily associated with the extruding of plastic members can be substantially discounted.

An embodiment of the fastener structure of this invention is also shown in FIGURE 5. In FIGURE 5, the closure strip takes a substantial change not encountered in the previous figures. Essentially, a first closure strip 48 is provided to be complementary with a second closure strip 49 to provide a locking and a sealing junction therebetween.

The closure strip 48 comprises bifurcated leg members 50 and 51 having integral rounded head portions 52 and 53 respectively. As in the previous examples, the head portions 52 and 53 are provided with overhanging ridges 54 and 55 and undercut engaging surfaces 56 and 57.

A groove element is formed between the bifurcated leg members and has a highly restricted groove opening 58 formed between the head portions and an enlarged inner cavity 59.

The second closure strip 49 has cup-shaped wall portions 60 and 61 abruptly terminated at flat edges 62 and 63. The cup-shaped wall portions 60 and 61 have inner grooves 64 and 65 formed adjacent to the abrupt ends 62 and 63 for receiving the rounded head portions 52 and 53 of the closure strip 48.

The elongated grooves 64 and 65 extend inwardly of the closure strip 49 to define a rib element which has a shank portion 66 and a head portion 67. As in the previous examples, the head portion 67 has overhanging ridges 68 and 69 and undercut engaging surfaces 70 and 71 for being cooperable with the like surfaces 56 and 57 of the bifurcated leg members 50 and 51.

The head portion 67 also has a rounded surface 72 for being received complementarily within the inner cavity 59 of the principal groove element.

The features described above of the closure strip of FIGURE 5 are concerned with the locking function of the cooperable elements. Therefore, these features are found on the structural units of the fastener which are constructed of a comparatively rigid thermoplastic substance. In contrast, however, the structure of FIGURE 5 is also provided with a facility for providing a hermetic seal between the single principal head and groove element.

The sealing function of the structure of FIGURE 5 is accomplished by providing sealing grooves 73 and 74 formed at the crest and base of the complementary head and groove elements. These grooves have a restricted neck portion shown at 75 and an enlarged inner cavity as at 76. Each of the grooves 73 and 74 are then filled with a comparatively soft thermoplastic substance. The result is that a hermetic seal is provided at a junction point 77 between the respective layers of soft material.

Another embodiment is illustrated in FIGURES 10 and 11 and comprises an interlocking structure similar to that of FIGURE 1 but having a ridge 135 formed at the rib elements 18 and 19. The ridge 135 is then compressed within the grooves 20 and 21 as shown in FIGURE 11 for forming a hermetic seal therebetween.

FIGURES 6 through 8 illustrate methods and devices for accomplishing the associated flexible fastener structures shown in FIGURES 1 through 5.

FIGURE 6 shows an extruder which is particularly suited for developing the closure strip structures as shown in FIGURES 3 and 4. This device comprises an extruder body 80 having a main channel 81 formed substantially centrally therein. This main channel 81 has a straight through passageway 82 and tapered wall portions 83 conducting to a port 84 formed within a die head 85. The die head 85 is secured to the extruder body 80 by a series of bolts 86.

Essentially, the port 84 is a die and is provided to conform to the desired configuration of a fastener having rib and groove elements. The configuraton of the die, shown in this example, is illustrated in FIGURE 7 which is a sectional view taken along the lines VII—VII of FIGURE 6. In FIGURE 7 the port or die 84 is shown to have three rib elements 87, 88 and 89 formed from a marginal portion 90 and connected to a web portion 91 as considered in the views of FIGURES 3 and 4.

The main channel 81 of the extruder 80 is provided with a worm drive 92 for urging a stream of a first thermoplastic substance 93 through the channel to the die 84. The themoplastic substance 93 will be utilized to form the rib elements and the web and marginal portions and hence will be composed of resins for forming a relatively rigid thermoplastic product.

In addition to the main flow channel 81, a second or separate channel 94 is provided to be substantially perpendicular to the main channel and has walls 95 secured rigidly to the main extruder body 80 at a point 96. The separate channel 94 is also provided with a worm drive 97 which may be operated independently of the main worm drive 92.

The separate channel 94 carries a second thermoplastic substance 98 which will be utilized for performing the sealing characteristic of the structures associated with the preceding figures. Therefore, the thermoplastic substance 98 will contain resins for providing a relatively soft material upon cooling. The substance is injected into the main stream of the main channel 81 by an extruder tubing 99 which extends through an opening 100 formed within the extruder body and which is received internally of a threaded plug 101 for being properly positioned within the main stream of the channel 81.

While the extruder tubing 100 is disposed in this embodiment to be substantially perpendicular to the main stream, it is provided with a curved neck portion 102 leading to an outlet 103 which is substantially coaxial with the main channel 81. In this way, the soft thermoplastic substance flowing from the outlet 103 will have a flow direction which is common to the direction of the main stream.

By properly positioning the extruder tubing, by properly adjusting the speed of the worm drive 97, and by properly orientating the die plate 85, the soft thermoplastic substance can be utilized in this device for forming a highly specific area or region on the thermoplastic strip. A principal advantage of this device is that the two thermoplastic substances are introduced while in a fluid state with a result that a strong integral junction is pro-provided between the two substances upon cooling.

FIGURE 8 shows a means for forming the structure as described in the discussion associated with FIGURE 5 and illustrates a means of pouring a soft thermoplastic substance into the sealing groove 74 of the rib member 67. In this example, the thermoplastic strip is formed initially in an extruder device as in FIGURE 6 and is allowed to cool. The soft thermoplastic substance is then poured into the groove in a fluid state where it forms the sealing member of FIGURE 5.

Essentially, this device comprises a means for moving the fastener strip 49 longitudinally thereof as indicated by the arrow 104. A heated thermoplastic substance is carried through a tubing 105 to a tongue-like portion 106 for feeding the soft substance 107 directly into the cavity 76 of the groove 74. Also, a plate 108 may be provided for molding the surface of the thermoplastic substance in the fastener head to provide a substantially smooth sealing surface. Air may be introduced through a sleeve 109 attached to the plate 108 for cooling and additionally forming the surface of the sealing member. This identical process may also be employed for filling the cavity as formed between the bifurcated leg members of the closure strip 48.

A final device for accomplishing the structures of FIGURES 1 through 5 and in particular for accomplishing the structures indicated in FIGURES 1 and 2, is shown in FIGURE 9 and involves a means for spraying a fluid state thermoplastic substance onto highly specialized regions of an especially developed thermoplastic strip. The extruder used to produce the principal flexible closure strip of FIGURE 9 may be similar to that shown in FIGURE 6, however, it is provided with a specialized die head which has a means for providing surface, deficiencies at specifically chosen regions. In particular, the relative rigid thermoplastic substance formed by the web and marginal portions 110 and 111 respectively. In addition, rib and groove elements 112 and 113, provided at the marginal portion 111, are formed to have surface deficiencies 114 and 115 respectively.

In this application, a surface deficiency at the flexible closure strip indicates a region of interlocking elements where the cooperable surfaces are purposely provided to be noncomplementary. For instance, the surface indicated by the line 116 may be the surface which is required for complementary fitting of the rib and associated groove elements. However, the surface indicated by the line 117 is the surface which is formed in the extruder die plate, and the difference between these two surfaces is termed a surface deficiency.

Once the flexible closure strip has been formed and cooled, a series of spray nozzles 118 through 121 are provided to conduct from a source of a fluid state thermoplastic substance and are orientated to direct concentrated streams 122 through 125 of that substance onto the regions of the flexible closure strip which are characterized as having a surface deficiency. As in the example of FIGURE 8, the strip of FIGURE 9 is provided to move longitudinally thereof as indicated by the arrow 126.

By providing the proper orientation of the spray nozzles 118 through 125, by providing the proper surface deficiency in the molding of the initial flexible closure strip structure, by providing proper longitudinal motion of the closure strip, and by adjusting the flow rate through the spray nozzles, the build-up of the soft thermoplastic substance will occur at the regions 127 through 130 for eliminating the surface deficiency and for providing a sealing structure which when locked with the opposing closure strip will form an airtight union. Since the soft thermoplastic substance will readily compress it may be desirable in certain instances to build this material up beyond the surface line 117. This can be done either by spraying on the resilient material or by extruding an extra small ridge of resilient material onto the main rib itself. In this fashion, the ridge of resilient material is compressed when the fastener is interlocked and an absolutely tight seal is assured.

It will be understood that various modifications may be suggested by the embodiments disclosed, but I desire to claim within the scope of the patent warranted hereon all such modifications which come within the scope of my invention.

I claim as my invention:

1. A flexible closure comprising:
    a pair of flexible closure strips each having a web portion and a marginal portion formed integrally therewith,
    the marginal portions having interlocking elements extending therealong,
    the interlocking elements of one closure strip including at least a rib element,
    the interlocking element of the other closure strip including at least one groove element,
    said rib element having an enlarged head portion rounded at its extremity and being cooperable with a complementary groove element of an opposing closure strip,
    said rib and groove elements having undercut engaging surfaces providing a mechanical interlock,
    said marginal portions formed of a relatively rigid thermoplastic substance and at least a portion of one of said elements formed of a relatively soft sealing thermoplastic substance,
    said groove element formed slightly smaller than its complementary engaging rib element,
whereby said soft thermoplastic substance is kept under compression during engagement of said rib and groove elements.

2. A flexible closure in accordance with claim 1 wherein said portion formed of a relatively soft thermoplastic substance comprises a portion of said groove element formed of said soft sealing thermoplastic substance in the vicinity of the groove portion contacting said rounded extremity of said rib element.

3. A flexible closure in accordance with claim 1 wherein said rib element is formed of said soft sealing thermoplastic substance.

4. A flexible closure in accordance with claim 1 wherein a portion of both said rib and groove elements are formed on said soft sealing thermoplastic substance.

5. A flexible closure in accordance with claim 1 wherein said rib element includes an integral soft sealing thermoplastic portion at the rounded extremity thereof and wherein said soft sealing portion is compressed during engagement with a complementary groove element.

6. A flexible closure in accordance with claim 1 wherein a groove element is formed adjacent to one of said rib elements on the same strip and wherein a continuous curved surface extends from the rounded head portion of said one rib element to the base of said adjacent groove element and wherein said portion of relatively soft sealing substance comprises a layer formed integrally at said continuous curved surface.

7. A flexible closure in accordance with claim 6 wherein said head portion of one of said closure strips is fitted within one of said groove elements of said other closure strip and has a first of said continuous curved surfaces contiguous with a second of said continuous curved surfaces and wherein a layer of a substantially soft thermoplastic substance is formed integrally with each of said first and second continuous surfaces for providing a hermetic seal therebetween.

8. A flexible closure in accordance with claim 3 wherein one of said rib elements is formed of said soft sealing substance and another of said rib elements is formed of a more rigid thermoplastic substance for improving the locking characteristics of said closure strip.

9. A flexible closure in accordance with claim 8 wherein said rib elements have overhanging ridges at opposite sides thereof cooperable with like surfaces of rib elements formed at the opposing closure strip.

10. A flexible closure in accordance with claim 1 wherein said groove element has bifurcated legs for receiving a rib element therebetween and wherein a rib element is interlockable within said bifurcated legs thereof.

11. A flexible closure in accordance with claim 10 wherein both a portion of said groove and a portion of said rib are formed of a soft sealing substance.

References Cited

UNITED STATES PATENTS

| | | |
|---|---|---|
| 2,452,899 | 11/1948 | Brown. |
| 2,520,467 | 8/1950 | Meralls. |
| 2,602,208 | 7/1952 | Gossner. |
| 2,756,172 | 7/1956 | Kidd. |
| 2,772,469 | 12/1956 | Staller _____ 24—204 |
| 2,780,261 | 2/1957 | Svec. |
| 3,176,364 | 4/1965 | Dritz. |

BERNARD A. GELAK, *Primary Examiner.*